United States Patent [19]

Breglia et al.

[11] 4,150,885
[45] Apr. 24, 1979

[54] STABILIZED SCENE VIEWING SYSTEM

[75] Inventors: Denis R. Breglia, Altamonte Springs; Robert J. Entwistle, Winter Park; Frank J. Oharek, Orlando; Gottfried R. Rosendahl, Winter Park, all of Fla.

[73] Assignee: The United States of America as represented by the Secretary of the Navy, Washington, D.C.

[21] Appl. No.: 817,953

[22] Filed: Jul. 22, 1977

[51] Int. Cl.² ............................................. G03C 11/00
[52] U.S. Cl. .................................. 352/130; 352/136; 352/138; 355/5; 350/19; 354/78
[58] Field of Search ................... 355/5; 352/130, 136, 352/138; 354/77, 78; 350/19, 20

[56] References Cited

U.S. PATENT DOCUMENTS

| | | | |
|---|---|---|---|
| 2,688,278 | 9/1954 | Tuttle | 354/78 |
| 3,008,396 | 11/1961 | Mito | 350/19 |
| 3,168,857 | 2/1965 | Hutto | 355/5 |
| 3,850,514 | 11/1974 | Land | 352/130 |

FOREIGN PATENT DOCUMENTS 1225035  3/1971  United Kingdom ................... 350/19

Primary Examiner—Monroe H. Hayes
Attorney, Agent, or Firm—Richard S. Sciascia; Don D. Doty

[57] ABSTRACT

A stabilized viewing system is disclosed as having a telescope for viewing an object by an observer when the object is remotely located from the observer, a camera for timely photographing a succession of pictures of the object on a film that is processed immediately prior to exposure of the object of the film by a processing fluid which causes a positive image to be produced on the film after exposure of the object on the film which may be viewed by the observer immediately thereafter, a unique movable linkage-type servomechanism connected between the telescope and the camera for enabling one or the other to be selected as desired by the observer, in order that he may either view the object directly or the filmed image thereof, and a magnifying eyepiece disposed in such manner with respect to the telescope and the film of the camera that either one or the other may be observed in magnified form.

20 Claims, 5 Drawing Figures

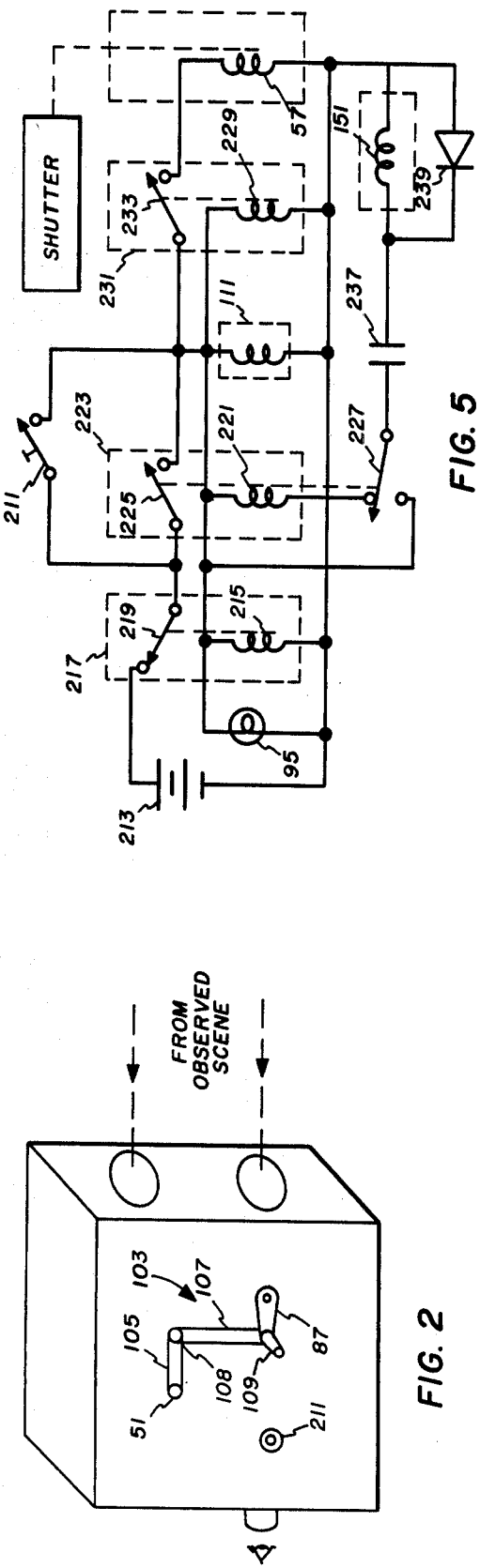
FIG. 5
FIG. 2
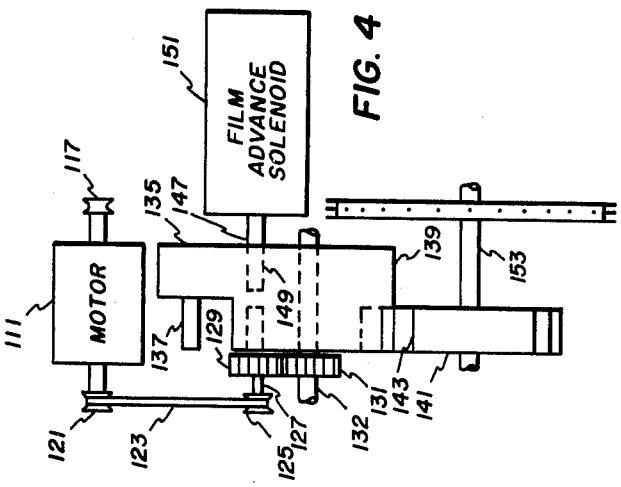
FIG. 4
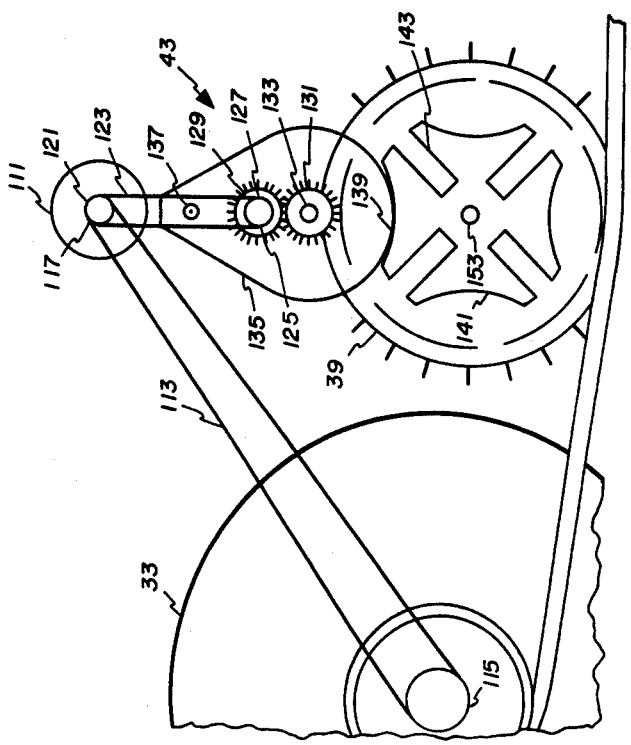
FIG. 3

STABILIZED SCENE VIEWING SYSTEM

FIELD OF THE INVENTION

The present invention, in general, relates to image or scene observing instruments and, in particular, is an improved telescopic type image or scene magnification system. In even greater particularity, the subject invention comprises an effectively vibration stabilized power magnified image viewing system that permits an observer located on a vibrating platform to timely observe an object, image, or scene at a considerable distance and with relatively high magnification, without the "jiggle" that ordinarily accompanies high magnification devices used for such purposes, such as telescopes and the like.

DESCRIPTION OF THE PRIOR ART

The problem of observing magnified views of scenes located at a distance while the observer is located on or in a vibrating environment is old and well known. For example, anyone looking through a hand held telescope, binoculars, or other device having a magnification power greater than seven has difficulty in keeping the scene which he is attempting to view in sight, merely because his hands and arms are not steady enough to prevent some "jiggle." Moreover, even greater observation difficulty is encountered when the observer is riding in a helicopter or other device which induces additional motions to both observer and the observation instrument being used. Because the image motions caused thereby are usually quite complicated in nature, complex solutions have ordinarily been employed for the solving thereof. Consequently, heretofore, such solutions have been, either directly or indirectly, based on stabilizing the viewed magnified image as a result of stabilizing the optical system used to view it. Therefore, in the past, gyroscopically stabilized mounts and platforms have been used to steady telescopes, etc.; gyroscopically controlled variable angle prism systems have been incorporated in the optical systems used; and mechanical and gyroscopic stabilization of the objective lenses included in the viewing instruments have been employed.

SUMMARY OF THE INVENTION

Although quite satisfactory for some purposes, the aforementioned prior art leaves something to be desired, inasmuch as it is usually delicate and complex of structure, costly to manufacture, calibrate, and maintain, and, perhaps most important, does not provide as much stabilization as is necessary or desirable for optimum viewing whenever the ambient environmental vibration — and, hence, optical instrument movement — is very great, such as may be experienced while flying a helicopter in rough air or sailing a small ship on a rough sea.

Briefly, the instant invention comprises a telescope and camera combined with such interacting and interconnecting structure that will permit an observer to search for a particular scene or object by means of the telescope arrangement, and once acquired, substantially instantaneous pictures thereof are taken and developed at intermittent times approximately one second apart, which are then, in turn, viewed by the observer as an almost continuous scene of rapidly occurring still shots. Because said still shots are viewed in real time almost immediately after they have been taken, the movement thereof, if any, is only that which coincides with the movement of the subject invention and, hence, no exaggerated movement of the viewed image occurs. As a consequence, a more stable image of the scene is viewed by the observer within a time frame that is substantially the equivalent of direct observation thereof for most practical purposes.

Therefore, an important object of this invention is to provide an improved stabilized image telescope.

Another object of this invention is to provide an improved method and means for observing an object or scene from a moving and/or vibrating platform, such as, for example, from a helicopter, ship, boat, or the like.

Another object of this invention is to provide a new and unique method and means for producing a magnified image of a remotely located object or scene.

A further object of this invention is to provide a method and means for almost instantaneously recording — and, thus, effecting a permanent record of — the image of an object after it has been observed through a telescope by a human being or other entity or instrument.

Still another object of this invention is to provide a new and unique telescope that is relatively economical to manufacture, use, maintain, transport, and store and, in addition, which may be constructed to be small in size and light in weight (and, hence, easily handled) compared to gyroscopically stabilized imaging systems of comparable resolution and power.

Other objects and many of the attendant advantages of this invention will be readily appreciated as the same becomes better understood by reference to the following detailed description, when considered in connection with the accompanying drawings wherein:

BRIEF DESCRIPTION OF THE DRAWING

FIG. 2 illustrates one possible external view of the invention shown in perspective;

FIG. 3 shows an elevational view of a typical geneva lock mechanism as it may be used as an intermittent film advance in the invention;

FIG. 4 is a partial end view — with some parts removed — of the geneva film advance mechanism of FIG. 3; and FIG. 5 discloses a schematic diagram of the electrical circuit which causes the various and sundry elements of the device of FIG. 1 to function in a timely manner and, thus, in a predetermined programmed manner.

DESCRIPTION OF THE PREFERRED EMBODIMENT

Figure 1:
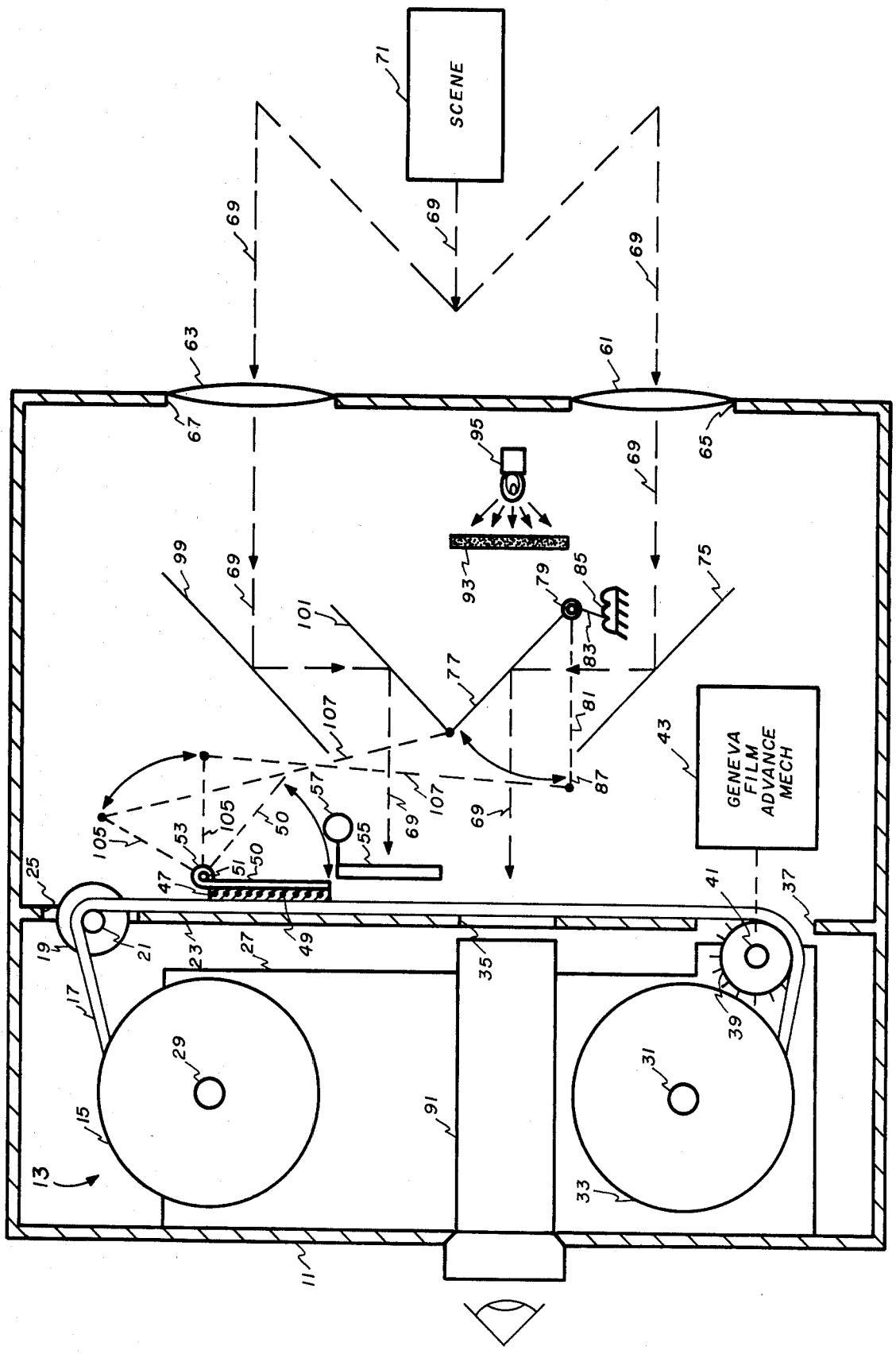
FIG. 1 depicts a schematic cross-sectional representation of the subject invention.

Referring now to FIGS. 1 and 2, there is shown (in simplified form for the sake of simplicity of disclosure) the subject invention as having a box-like housing 11 which has a camera-like film exposure system 13, including a feed reel 15 with a film 17 — such as, for instance, so-called Super 8 film manufactured by Eastman Kodak Co., Rochester, N.Y. — wound thereon and extending around roller 19, the latter of which is connected to housing 11 in any suitable conventional manner, say, as by a shaft 21. An internal film guide wall 23 is preferably used to support film 17, as it is moved or advanced (downwardly in the view thereof in FIG. 1), and to enable such action, said roller 19 and film 17 may extend through a hole 25 disposed therein. A separate support member 27 may be connected to the inside of housing 11 and be designed as to rotatably support said feed reel 15 on a shaft 29 connected thereto. Said support member 27 likewise is used to support another shaft 31 on which a rotatable take-up reel 33 is mounted in the conventional manner.

Wall 23, in this particular embodiment, extends from the top of housing 11 to the bottom thereof, and for purposes which will be explained more fully subsequently, has a sight hole 35 located therethrough at some intermediate position and another hole 37, through which said film 17 and a sprocket 39 (mounted on shaft 41) on which it rides, extends. Of course, film 17 is moved by the teeth of sprocket 39 engaging holes therein in the conventional manner. A geneva film advance mechanism 43 is mounted in or on support member 27 (depending on its design configuration) and will be discussed more fully in conjunction with FIGS. 3 and 4 subsequently. Film 17 is appropriately attached to reel 33 for timely take-up thereby.

A pad or wick 47 saturated with developing solution 49 is mounted in housing 11 in such manner that it rapidly processes the emulsion side of film 17 by means of diffusion transfer, whenever it is permitted to come into contact therewith prior to the exposure thereof. In other words, the processing of the film 17 occurs almost instantaneously as a result of the processing liquid being applied to the emulsion side thereof from liquid-impregnated applicator pad or wick 47. An example of processing liquid 49 for such purposes is a mixture of a customary silver reducing agent — such as, for instance, hydroquinone — and a fast working silver solvent — such as, for example, sodium thiosulphate, sodium thiocyinate, or predetermined mixtures thereof — optionally combined with conventional accelerating and stabilizing agents.

Wick 47 may involve any suitable geometrical configuration and processing liquid supply arrangement. For example, one similar to either one of those shown in U.S. Pat. Nos. 3,719,416 and 3,850,514 to Land, dated Mar. 6, 1973, and Nov. 26, 1974, respectively, may be incorporated for such purpose. Likewise, the film and processing liquids referred to therein may be used in the instant invention as film 17 and developing solution 49, too. As a matter of fact, it may be worthy of note that the entire motion picture photographic system of either one of the aforesaid patents may, after appropriate modification as taught herein, be used as the photographic system incorporated in the subject invention, inasmuch as, to a considerable extent, they represent systems that could be made to be useful for such purpose.

As best shown in FIG. 1, wick 47 is attached to a rigid backing plate 50 which is integrally connected to a shaft 51 that is rotatable in a hinge-like bearing 53 that is effectively connected to one or more of the walls of housing 11. Hence, upon rotation of shaft 51, wick 47 may be made to come into contact with film 17 or be located out of contact therewith, depending on the mode of operation occurring at any given time, as will be explained more fully below. At this time, it would appear to be worthy of note that the quick processing of film by diffusion transfer method is not new, as evidenced by the aforesaid disclosure thereof in U.S. Pat. No. 3,850,514 to Land, issued Nov. 26, 1974. Accordingly, it is believed that the incorporation thereof and the working thereof will be self-evident from the teachings thereof presented herein. Therefore, for the sake of keeping this disclosure as simple as possible, no further discussion thereof will be presented at this time.

A self-cocking focal plane shutter 55 is mounted for being timely opened and closed in front of film 17 immediately after it has been wetted by the processing fluid of wick 47, and a shutter solenoid 57 effects such operation in a timely manner (see FIG. 1 for the electrical operation thereof).

A pair of objective lenses 61 and 63 are respectively mounted in holes 65 and 67 in such manner that they will simultaneously receive the image 69 of a scene 71 or other object on which they are sighted. Of course, since the instant invention, in effect, constitutes a telescope, other lenses or optical elements may be associated therewith for focusing or other purposes — such as, for instance, lenses having a zoom focal length, a diameter of 75 millimeters, and a field of view of 7° — although they are not shown. Nevertheless, incorporation of such elements — including the aforesaid objective lenses — would merely involve the making of design choices which would optimize the invention for its particular intended use at any given instant, and so doing would obviously be well within the purview of one skilled in the art having the benefit of the teachings presented herewith.

In optical alignment with objective lens 61 is a first reflector 75, and disposed therefrom in an offset manner is another reflector 77. Reflector 75 is mounted in a fixed position within housing 11 in any conventional manner, but reflector 77 is integrally connected to a shaft 79 in such manner that it may be rotated to a position shown by dashed line 81. The action of a lever extension 83 from shaft 79 against notched spring 85 causes reflector 77 to remain in either of two positions — one as shown, and the other located at dashed line 81 — unless moved by the person operating the invention as a result of his moving a trigger crank 87 connected thereto, as best seen in FIG. 2. Of course, an over-the-center spring mechanism may be used instead of extension 83 and notched spring 85 to timely hold reflector 77 in its proper place, too, if so desired.

In the disposition shown in FIG. 1, reflector 77 is mounted in parallel with reflector 75 in such manner that the portion of image 69 received by objective lens 61 is transmitted through hole 35 to and through a magnifying eyepiece 91, likewise conventionally mounted in housing 11 in alignment with the optical axis of said hole 35. But, as will be mentioned again during the discussion of the operation of the invention, when reflector 77 is located at position 81, it will stop or retroflect image 69 thereat.

Located in front of reflector 77 and in alignment with the optical axis of magnifying eyepiece 91 is a translucent glass or plastic screen 93, and on the side thereof that is opposite that of said eyepiece 91 is an electric lamp or light 95 which is effectively connected for being turned on whenever lever 87 is moved to the "down" position or that position which moves reflector 77 to position 81 for reasons which will be explained more fully below. Of course, when turned on, light 95 illuminates screen 93 which, in turn, diffuses the light thereof as it passes therethrough, thereby permitting exposed and processed film 17 to be observed with optimum resolution, since it is effectively located in front thereof, as far as an observer 97 looking through eyepiece 91 is concerned.

Image 69 from scene 71 is, for all practical purposes, received at objective lens 63 at substantially the same time it is received by objective lens 61, inasmuch as lenses 61 and 63 are located very close together compared to the distance between the instant invention and the object or scene 71 being viewed therethrough. Therefore, image 69 is reflected by another reflector 99 at the same time it is being reflected by reflector 75, since reflector 99 is disposed on the optical axis of and, thus, is in alignment with said objective lens 63. Still another reflector 101 is mounted in housing 11 in such manner that it receives the image 69 reflected by reflector 99 and, in turn, reflects it toward shutter 55 along the upstream optical axis thereof. Of course, as will be mentioned again, when shutter 55 is closed, image 69 stops thereat; when shutter 55 is open, image 69 passes therethrough and film 17 is exposed thereto.

At this time, it would perhaps be noteworthy that reflectors 75, 77, 99, and 101 may be any kind of reflectors, respectively, that are suitable for the occasion, such as, for example, mirrors, prisms, or the like. Moreover, it should be understood — and, of course, would be obvious to the artisan — that all of the elements of this invention are properly mounted (and, thus, relatively disposed with respect to each other) by well known, conventional, and commercially available mounting and support apparatus, with the respective geometrical configuration thereof being determined by design choice, when taking into consideration the size, weight, cost, etc., preferred. Hence, for the sake of simplicity of disclosure, such design choice elements as would be needed for connection, interconnection, mounting, and support purposes have been omitted, obviously without detracting therefrom.

Reference is now made to FIG. 2, specifically, and FIG. 1 ancillarially, for the purpose of discussing some external but necessary structures.

Although a number of important factors are involved in making this invention product its above stated results, one thereof is a unique lever mechanism 103 which is effectively connected between pivotal wick 47 (or backing plate 53 therefor) and the handle extremity of viewing mode crank 87. Said mechanism causes wick 47 to be rotated by its integrally connected shaft 51 that, in turn, is rotatably attached in any conventional manner (not shown) between the walls of housing 11 that are normal thereto, as previously indicated. Therefore, wick 47 is rotatably lifted from the surface of film 17 — and, hence, does not process it but, instead, leaves it clear and transparent for viewing therethrough — at the time pivotal mirror 77 is rotatably located in the "downward" position (as illustrated in FIGS. 1 and 2) for direct viewing of scene 71 by observer 97.

As best seen in FIG. 2 (but as shown in phantom by dashed lines in FIG. 1), a first lever 105 is integrally or fixedly connected to one end of shaft 51 that extends through a light-tight hole in the wall of housing 11 (not seen). Pivotally connected to the outer extremity of lever 105 is one end of another lever 107, with the pivot connector means 108 used therefor being any conventional type (and, hence, disclosed schematically). The other end of lever 107 is likewise pivotally connected to the handle extremity of the aforesaid crank 87 by, say, handle shaft 109. Of course, for convenience during operation, handle 109 preferably extends outwardly from the aforesaid extremity of crank 87, as is conventional for crank handles.

Perhaps it would be noteworthy at this time that the above lever mechanism 103 is merely one representation of a method and means for synchronizing the movement of wick 47 and mirror 77, so as to place wick 47 against the surface of film 17 at the same time crank 87 is located in the photographing, indirect viewing mode of operation and vice versa. Consequently, it should be understood that any suitable servo system may be substituted therefor without violating the scope or spirit of this invention. Obviously, so doing would be well within the purview of the artisan having the benefit of the teachings presented herewith.

As previously mentioned, the respective levers of mechanism 103 are shown by dashed lines for both positions of crank 87; therefore, insofar as this disclosure is facilitated by so doing, reference numerals like those depicted in FIG. 2 are also used in FIG. 1 for like parts at both possible operational positions.

Referring now to FIGS. 3 and 4, there are shown therein two views — one elevation, one partial end — of a mechanism that will serve the purpose of, and may be used as, geneva film advance 43 of the device of FIG. 1.

Geneva film advance 43 is herewith disclosed without limitation, because it would undoubtedly be obvious to the artisan to substitute other film advance mechanisms therefor, if so desired. Since some of the parts of said geneva film advance 43 have already been disclosed in FIG. 1, like reference numerals will be used therefor.

Take-up reel 33 is disclosed as being driven by an electric motor 111 and a friction drive belt 113 connected between pulleys 115 and 117 attached thereto, respectively. Belt 113 may, for example, be a conventional helical spring belt which is resilient enough to effect a friction drive on said pulleys and yet slip as necessary to compensate for whatever amount of film is wound on reel 33 at any given instant.

Motor 111 likewise drives geneva mechanism 119 by means of pulley 121, friction belt 123, pulley 125, shaft 127, gears 129 and 131, and shaft 133. A crank 135 containing a pin 137 rotates about shaft 133. It has a rounded portion 139 which fits in a complementary manner in a lock portion 141 having a plurality of slots 143 — in this case four — which are sized to have pin 137 slidably inserted therein and removed therefrom, as is conventional with geneva lock mechanisms. Consequently, in the particular arrangement shown, lock portion 141 and the aforementioned sprocket 39 connected thereto turn one-quarter turn for every full turn of crank 135, thereby providing intermittent action thereat which, in turn, intermittently advances film 17 engaged with the teeth of said sprocket.

As best seen in FIG. 4, geneva crank 135 is locked in a stationary position during those times between film advances by a pin 147 timely inserted in a hole 149 in crank 135, with pin 147 being inserted and withdrawn by a film advance solenoid 151, with the withdrawn position thereof causing crank 135 to be unlocked, thereby permitting film 17 to be advanced a distance equal to one-quarter of the circumference of sprocket 39, due to its rotation about shaft 153, to which lock 141 is likewise connected.

FIG. 5 schematically shows the electrical circuit which timely enables and disables various ones of the components depicted in FIGS. 1, 3, and 4. Therefore, once again, like components have been given like reference numerals therein. In order to make the instant invention self-contained as a unitary device, all of the electrical and mechanical apparatus thereof is appropriately mounted within housing 11, except the rear end of eyepiece 91, parts of linkage servo-mechanism 103, and a film advance trigger switch 211, illustrated only in FIGS. 2 and 5.

FIG. 5 shows the electrical programmer system which causes the subject invention to be self-contained and, thus, a readily portable unitary device, as previously suggested. Incorporated therein is a twelve volt direct current battery 213 which, of course, acts as a power supply of convenience. Connected to the negative terminal thereof is one electrical lead of the aforesaid lamp 95 (see FIG. 1); one terminal of a solenoid 215 of a single pole — double throw delay switch 217, the switch 219 of which is normally closed whenever said solenoid 215 is deenergized; one terminal of a solenoid 221 of a double pole — double throw latching relay switch 223, one switch 225 of which is normally open and one switch 227 of which is normally closed whenever said solenoid 221 is deenergized; one terminal of the aforesaid motor 111 (see FIGS. 3 and 4) for driving the aforementioned film advance mechanism and take-up reel, etc.; one terminal of a solenoid 229 of a single pole — single throw time delay relay switch 231 (used for allowing film 17 to advance before exposure), the switch 233 of which is normally open when solenoid 229 is deenergized; one terminal of the aforesaid shutter actuating solenoid 57 (see FIG. 1); and one terminal of the aforementioned film advance release solenoid 151 (see FIG. 4).

The other terminals of lamp 95, solenoid 215, solenoid 221, motor 111, and solenoid 229 are interconnected and connected to the stationary contacts of switches 225 and 211 and to the movable arm contact of switch 233. The movable arm contact of switch 211 is connected to the movable arm contacts of switches 219 and 225, with the stationary contact of said switch 219 being connected to the positive terminal of battery 213. The stationary contact of said switch 233 is connected to the other terminal of shutter actuating solenoid 57.

Both of the aforementioned time delay relays 217 and 231 may be any suitable, conventional, commercially available relays; however, it has been determined that time delay relay type TS012AB015 of the Cornell-Dublier Company of Fuquay-Varina, N.C., that is adjustable between 0–15 seconds delay, has 12 VDC input to the solenoid thereof, and fits a double pole — double throw octal socket, may be used for said delay relays, if so desired.

The aforesaid interconnected terminals of solenoids 215, 221, 229, and motor 111 are connected to the upper stationary contact of switch 227, which is normally closed whenever solenoid 221 is deenergized. And the movable arm contact of said switch 227 is connected through a capacitance 237 to the other terminal of the aforesaid film advance release solenoid 151. A diode 239 having a anode and a cathode is connected in parallel with solenoid 151 in such manner that the cathode thereof is connected to the negative terminal of battery 213 and the anode thereof is connected to one plate of the aforesaid capacitance 237.

It would perhaps be worthy of note at this time that each and every one of the components used to make up this invention is well known and conventional, per se; hence, it is to be understood that it is their new and unique interconnections and interactions that effect a new and unique combination of elements that constitutes the subject invention and causes it to produce the improved results stated above.

MODE OF OPERATION

The operation of the invention will now be discussed briefly in conjunction with all of the figures of the drawing.

Referring now to FIG. 1, wherein the concept of the invention is embodied in a combination structural and schematic form, it may be seen that, in operation, objective lenses 61 and 63 are directed toward scene 71 to be viewed. The light of image 69 from scene 71 is refracted simultaneously by objective lenses 61 and 63 before traveling along the optical axes thereof, respectively, as two separate and distinct but identical images thereof. But because said images are actually the same after refraction by objective lenses as they were before, and because they are identical, they are both referenced by the same reference numeral, viz., reference numeral 69.

Because the use of the instant invention by human observer 97 actually involves two modes of operation — some of which are performed simultaneously, and some of which are performed alternatively — the first mode — herein called the scene scan and search mode — will be discussed first as follows.

After refraction by light gathering objective lens 61, image 69 of scene 71 is reflected through approximately 90° by fixed mirror 75, after which it is again reflected through approximately 90° by pivotal mirror 77 toward its image plane located at about the position where the clear, unprocessed film is passing in front of eyepiece 91. Image 69 is then viewed in magnified form by observer 97 as a result of his looking at it through eyepiece 91. Thus, it may readily be seen that observer 97 may continuously use the invention as a substantially ordinary telescope merely by maintaining rotatable mirror 77 in its "upward" position (as shown in FIG. 1) as a consequence of his manually placing crank 87 in its handle-up position. Of course, when mirror 77 is located in its upward position, mechanism 103 (partially on the outside of housing 11, as best seen in FIG. 2) causes wick 47 to not be in contact with film 17, thereby not processing it and, hence, leaving it sufficiently clear or transparent.

Once a scene has been acquired that observer 97 wants to maintain in view in a more stabilized manner, he manually manipulates crank handle and crank 87 to the "downward" position. So doing causes mirror 77 to be rotated "downward" to its dashed line position 81, thereby stopping that portion of image 69 being refracted by objective lens 61 from being reflected toward eyepiece 91. In addition, so doing — via mechanism 103 — causes wick 47 to be put into contact with film 17, so as to start the instantaneous processing thereof, so as to, in turn, enable it to produce positive images of scene 71 from light 69 whenever shutter 55 is open in such manner as to allow the exposure of film 17 to said light 69.

In order to cause film 17 to be exposed to image 69 when shutter 55 is open, it must be moved or advanced, say, one frame, so that that portion thereof "painted" with processing fluid 49 will be moved to a position immediately behind said shutter 55. Such film advancing operation is then effected by pressing button-actuated switch 211 on the outside of case 11, thereby closing it and starting the sequence of events performed by the electrical circuit of FIG. 5. The closing of switch 211 causes twelve volt battery 213 to energize: (1) solenoid 215 of single pole - double throw relay 217, which, in turn, causes switch 219 to be subsequently opened after a predetermined delayed period of time; (2) solenoid 221 of latching relay 211, which, in turn, causes the immediate closing of switch 225 and the immediate changing of the position of the movable arm of switch 227 to open its upper contact and close its lower contact; (3) D.C. motor 111, causing it to run at, say, 120 rpm; (4) solenoid 229 of single pole - single throw time delay relay 231, thereby closing switch 233 after a predetermined time delay; and (5) lamp 95 to effect the lighting thereof.

Once latching relay 217 is energized, it keeps all of the aforementioned electrical system elements energized, regardless of whether or not switch 211 is manually released before the conclusion of any given film advance cycle. In this particular preferred embodiment, it has been found that the operation is quite satisfactory if motor 111 remains energized for the entire cycle, time delay relay is set for a fixed time delay of approximately 1.5 seconds, and time delay relay 231 is set for a delay period of approximately one second, so that switch 233 is closed approximately one second after switch 211 is closed, thereby permitting film 17 to be advanced one frame before it becomes exposed, as a result of shutter 55 being opened as a consequence of the timely closure of said switch 233. When switch 227 has moved in such manner as to open its upper contact and close its lower contact as a result of solenoid 221 being energized, it causes film advance release solenoid 151 to be timely energized through the charging of capacitance 237, thereby pulling locking pin 147 (see FIG. 4) from hole 149 in lock 139. Of course, unpinning lock 139 permits it to be rotated by the concerted action of energized motor 111, pulley 121, belt 123, shaft 127, and gears 129 and 131, the latter of which is attached to a shaft 132 on which rounded portion 139 of crank 135 rotates. Hence, pin 137 rotates with crank 135, enters slot 143 in lock 141 and, thus, causes said lock 141 to be turned 90° for every revolution of said crank 135, as is conventional in geneva lock mechanisms. And because slotted lock 141 is effectively connected to sprocket 39 by means of shaft 153, sprocket 39 is rotated a quarter turn therewith, and film 17 advances one frame. The aforesaid switch 219 within time delay relay 217 opens about 1.5 seconds after switch 211 is closed, and as a consequence of the opening thereof relay solenoids 215, 221, 229, and 57, motor 111, and lamp 95 are deenergized to complete the cycle. Of course, while energized motor 111 drives take-up reel 33 by means of friction belt 113.

In summary, from the foregoing, it may be seen that as film 17 is properly advanced due to the closing of switch 211 by operator 97, immediately processed and exposed positive pictures are made thereon of whatever scene 71 is being shot at any given time, and as film 17 continues to advance to the position where it is in front of hole 35 and the front end of eyepiece 91, it is illuminated by energized lamp 95 and translucent screen 93 in such manner that the pictures of scene 71 present thereon may be easily observed in magnified form — and, hence, in greater detail — by observer 97. Since little or no relative movement exists between the eye of observer 97 and the pictures on processed film 17 while they are being viewed, no "jiggle" occurs to interfere with, move, and distort the images thereof. Therefore, the viewing thereof is much more stabilized, for all practical purposes.

From the foregoing, it may readily be seen that the new and unique stabilized image viewing system of this invention constitutes a considerable improvement in the art.

The artisan will readily appreciate from the teachings presented herewith that some structural alternatives may be incorporated in the invention if so desired. For instance, a single objective lens and changeable optical paths may be designed and used, rather than the disclosed dual channel lens system. A long persistence, high resolution phosphor screen excited by an image intensifier may be used instead of a film system in the photography mode. And a 16 mm film format with different optical elements may be utilized, if warranted by operational and other circumstances.

Obviously many modifications and variations of the present invention are possible in the light of the above teachings. It is, therefore, to be understood that within the scope of the appended claims the invention may be practiced otherwise than as specifically described.

What is claimed is:

1. A stabilized image viewing system, comprising in combination:
   means for viewing an object by an observer that is spatially disposed from said object;
   means for timely photographing a succession of separate and distinct images of the aforesaid object on a predetermined film adapted for being processed immediately prior to the exposure of said film to the separate and distinct images of said object;
   means effectively connected to said photographing means for processing the film thereof in such manner prior to the exposure thereof to said object as to timely effect a positive image of said object on said film after exposure of said film to said object which may be viewed by said observer almost immediately thereafter; and
   means connected between said object viewing means and the aforesaid photographing and film processing means for selectively enabling one or the other in such manner that said observer may either view said object or the aforesaid filmed image thereof in response to predetermined trigger signals, respectively.

2. The invention of claim 1, further characterized by means contiguously disposed with the aforesaid object viewing means and predetermined exposed portions of the film of said photographing means for timely selectively viewing either said object or the successive filmed images thereof in magnified form.

3. The invention of claim 1, further characterized by a housing means effectively connected to said object viewing means, said photographing means, said film processing means, and said enabling means for the mounting and support thereof thereon as a unitary device.

4. The device of claim 1, wherein said means for viewing an object by an observer that is spatially disposed therefrom comprises:
   an objective lens having an optical axis;
   a fixed mirror spatially disposed from said objective lens on the optical axis thereof; and
   a movable mirror spatially disposed from said fixed mirror on the reflection axis thereof, said movable mirror being rotatable in such manner as to be physically parallel with said fixed mirror and, thus, reflect any image received from said fixed mirror along an optical axis that is parallel to the optical axis thereof or be angularly disposed with said fixed mirror in such manner as to stop or retroflect any image received therefrom.

5. The invention of claim 4, further characterized by a magnifying eyepiece spatially disposed from said movable mirror and on that optical axis thereof that occurs whenever said movable mirror is in physical parallel with the aforesaid fixed mirror.

6. The device of claim 1, wherein said means for timely photographing a succession of separate and distinct images of the aforesaid object on a predetermined film adapted for being processed immediately prior to exposure thereof to said object as to timely effect a positive image of said object on said film after exposure of said film to said object which may be viewed by said observer almost immediately thereafter comprises:
- a photographic film adapted for being moved along a predetermined path and exposed or not exposed to the aforesaid object;
- take-up reel means connected to said photographic film for effecting the movement thereof along said predetermined path;
- supply reel means connected to said predetermined film for the storing and timely supplying thereof when moved by said take-up reel;
- a geneva lock type film advance means disposed in such contact with said predetermined film as to cause it to timely advance one frame at a time in response to a given signal;
- motor means effectively connected to the aforesaid take-up reel and said film advance means for the driving thereof; and
- backing means for supporting said predetermined film along a portion of its predetermined path with sliding contact therebetween.

7. The device of claim 6, wherein said photographic film adapted for being moved along a predetermined path and exposed or not exposed to the aforesaid object comprises Eastman Kodak Super-8 film.

8. The device of claim 1, wherein said means effectively connected to said photographing means for processing the film thereof in such manner prior to the exposure thereof to said object as to timely effect a positive image of said object on said film after exposure of said film which may be viewed by said observer immediately thereafter comprises:
- a wick;
- a predetermined film processing fluid impregnated in said wick; and
- means effectively connected to said wick for timely effecting the holding thereof against said predetermined film in such manner that the emulsion side of said film will be wetted by said predetermined processing fluid.

9. The invention of claim 8, wherein said predetermined film processing fluid is a predetermined mixture of hydroquinone and sodium thiosulphate.

10. The device of claim 1, wherein said means connected between said object viewing means and the aforesaid photographing and film processing means for selectively enabling one or the other in such manner that said observer may either view said object or the aforesaid filmed image thereof in response to predetermined trigger signals, respectively, comprises a plurality of end-to-end-connected levers adapted for movement in response to trigger signals supplied by the aforesaid observer.

11. The device of claim 1, wherein said means connected between said object viewing means and the aforesaid photographing means for selectively enabling one or the other in such manner that said observer may either view said object or the aforesaid filmed image thereof in response to predetermined trigger signals, respectively, comprises a manually operated servo system, with said servo system including a predetermined plurality of series connected, relatively movable, hinged linkages.

12. The device of claim 1, wherein said means connected between said object viewing means and the aforesaid photographing means for selectively enabling one or the other in such manner that said observer may either view said object or the aforesaid filmed image thereof in response to predetermined trigger signals, respectively, comprises a servo system adapted for being responsive to a plurality of predetermined input signals.

13. A stabilized image viewing system, comprising in combination:
- means for viewing an object by an observer that is spatially disposed therefrom;
- means for timely photographing a succession of separate and distinct images of the aforesaid object on a predetermined film adapted for being processed immediately prior to the exposure thereof to said succession of separate and distinct images of said object;
- means effectively connected to said photographing means for processing the film thereof in such manner prior to the exposure thereof to said object as to timely effect a positive image of said object thereon after exposure of said object to said film which may be viewed by said observer immediately thereafter;
- means connected between said object viewing means and the aforesaid photographing and film processing means for selectively enabling one or the other in such manner that said observer may either view said object or the aforesaid filmed image thereof in response to predetermined trigger signals, respectively; and
- programmer means connected to the aforesaid photographing means and to said film processing means for timely effecting the actuation thereof simultaneously in response to a predetermined signal.

14. The device of claim 13, wherein said means for viewing an object by an observer that is spatially disposed therefrom comprises:
- an objective lens having an optical axis;
- a fixed mirror spatially disposed from said objective lens on the optical axis thereof; and
- a movable mirror spatially disposed from said fixed mirror on the reflection axis thereof, said movable mirror being rotatable in such manner as to be physically parallel therewith and, thus, reflect any image received from said fixed mirror along an optical axis that is parallel to the optical axis thereof or be angularly disposed therewith in such manner as to stop or retroflect any image received therefrom.

15. The device of claim 13, wherein said means for timely photographing a succession of separate and distinct images of the aforesaid object on a predetermined film adapted for being processed immediately prior to exposure thereof to said object as to timely effect a positive image thereon after exposure of said object to said film which may be viewed by said observer immediately thereafter comprises:
- a photographic film adapted for being moved along a predetermined path and exposed or not exposed to the aforesaid object;

take-up reel means connected to said photographic film for effecting the movement thereof along said predetermined path;

supply reel means connected to said predetermined film for the storing and timely supplying thereof when moved by said take-up reel;

a geneva lock type film advance means disposed in such contact with said predetermined film as to cause it to timely advance one frame at a time in response to a given signal;

motor means effectively connected to the aforesaid take-up reel and said film advance means for the driving thereof; and backing means for supporting said predetermined film along a portion of its predetermined path with sliding contact therebetween.

16. The device of claim 13, wherein said means effectively connected to said photographing means for processing the film thereof in such manner prior to the exposure thereof to said object as to timely effect a positive image of said object thereon after exposure of said object to said film which may be viewed by said observer immediately thereafter comprises:

a wick;

a predetermined film processing fluid impregnated in said wick; and means effectively connected to said wick for timely effecting the holding thereof against said predetermined film in such manner that the emulsion side of said film will be wetted by said predetermined processing fluid.

17. A stabilized image viewing system, comprising in combination:

means for viewing an object by an observer that is spatially disposed therefrom;

means for timely photographing a succession of separate and distinct images of the aforesaid object on a predetermined film adapted for being processed immediately prior to the exposure thereof to said succession of separate images of said object;

means effectively connected to said photographing means for processing the film thereof in such manner prior to the exposure thereof to said object as to timely effect a positive image of said object on said film after exposure thereof to said object which may be viewed by said observer immediately thereafter;

means connected between said object viewing means and the aforesaid photographing and film processing means for selectively enabling one or the other in such manner that said observer may either view said object or the aforesaid filmed image thereof in response to predetermined trigger signals, respectively;

programmer means connected to the aforesaid photographing means and to said film processing means for timely effecting the actuation thereof simultaneously in response to a predetermined signal;

means contiguously disposed with the aforesaid object viewing means and predetermined exposed portions of the film of said photographing means for timely selectively viewing either said object or the successive filmed images thereof in magnified form;

means spatially disposed from the film of said photographing means on the side thereof opposite that of said magnified form viewing means and in optical alignment therewith for illuminating said film at the same time said photographing and film processing means is actuated; and means effectively connected to said object viewing means, said photographing means, said film processing means, said enabling means, and the aforesaid film illuminating means for the support and housing thereof as a unitary entity.

18. The device of claim 17, wherein said programmer means connected to the aforesaid photographing means and to said film processing means for timely effecting the actuation thereof simultaneously in response to a predetermined signal comprises:

a battery having a positive terminal and a negative terminal;

an electric lamp, with one of the leads thereof connected to the negative terminal of said battery;

a first time delay relay having a solenoid and a normally closed switch actuatable thereby when energized by the aforesaid battery, with the one terminal of the solenoid thereof connected to the negative terminal of the aforesaid battery;

a latching relay having a solenoid and a normally open first switch actuatable to be closed upon energization thereof thereby, and a second switch actuatable by said solenoid in such manner as to open the normally closed contacts thereof and close the normally open contacts thereof when said solenoid is energized, with one terminal of the solenoid thereof connected to the negative terminal of said battery;

an electric motor, one terminal of which is connected to the negative terminal of said battery;

a second time delay relay having a solenoid and a normally open switch actuatable thereby, with one terminal of said solenoid connected to the negative terminal of said battery;

a shutter actuating solenoid, with one of the terminals thereof connected to the negative terminal of said battery;

a normally open, manually operated switch having a movable arm and a fixed contact, with the fixed contact thereof connected to the other terminals of the aforesaid electric lamp, the solenoid of said first time delay relay, the solenoid of said latching relay, said motor, and the solenoid of said second time delay relay, with the movable arm thereof connected to the movable arms of the switches of said first time delay relay and said latching relay;

a first electrical lead connected between the fixed contact of the switch of said first time delay relay and the positive terminal of said battery;

a second electrical lead connected between the fixed contact of said normally open first switch of said latching relay and the movable arm of the normally open switch of said second time delay relay;

a third electrical lead connected between the fixed contact of the normally open switch of said second time delay relay and the other terminal of the aforesaid shutter actuating solenoid;

a fourth electrical lead connected between the fixed contact of the normally closed second switch of the aforesaid latching relay;

a fifth electrical lead connected between the fixed contact of the aforesaid normally open, manually operated switch and the normally open fixed contact of the second switch of said first mentioned latching relay;

a capacitance, with one of the plates thereof connected to the movable arm of the second switch of said latching relay;

a film advance release solenoid connected between the other of the plates of said capacitance and the negative terminal of the aforesaid battery; and a diode connected in parallel with said film advance release solenoid.

19. The device of claim 17, wherein said means spatially disposed from the film of said photographing means on the side thereof opposite that of said magnified form viewing means and in optical alignment therewith for illuminating said film at the same time said photographing and film processing means is actuated comprises a light translucent screen.

20. The device of claim 17, wherein said means effectively connected to said object viewing means, said photographing means, said film processing means, and the aforesaid film illuminating means for the support and housing thereof as a unitary entity comprises a light-tight case.

* * * * *